United States Patent
Carnevali

(10) Patent No.: US 7,481,404 B2
(45) Date of Patent: Jan. 27, 2009

(54) FLEXIBLE SUPPORT ARM

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 293 days.

(21) Appl. No.: 10/698,158

(22) Filed: Oct. 31, 2003

(65) Prior Publication Data

US 2005/0092875 A1    May 5, 2005

(51) Int. Cl.
*F16M 13/00* (2006.01)
(52) U.S. Cl. .................... 248/160; 248/274.1
(58) Field of Classification Search ............... 248/160, 248/106, 274.1
See application file for complete search history.

(56) References Cited

U.S. PATENT DOCUMENTS

| | | | |
|---|---|---|---|
| 809,977 A | 1/1906 | O'Brian | |
| 1,786,459 A | 12/1930 | Simons | |
| 2,681,782 A * | 6/1954 | Morishita | 248/106 |
| 4,020,575 A * | 5/1977 | Kruger et al. | 40/1.5 |
| 4,842,174 A | 6/1989 | Sheppard et al. | |
| 5,135,189 A * | 8/1992 | Ghazizadeh | 248/104 |
| 5,489,075 A * | 2/1996 | Ible | 248/104 |
| 5,690,307 A * | 11/1997 | Joyce | 248/274.1 |
| 5,810,306 A * | 9/1998 | Hung et al. | 248/274.1 |
| 5,842,670 A * | 12/1998 | Nigoghosian | 248/160 |
| 5,956,861 A * | 9/1999 | Barnes | 34/90 |
| 6,032,910 A | 3/2000 | Richter | |
| 6,315,252 B1 * | 11/2001 | Schultz | 248/160 |
| 6,637,642 B1 * | 10/2003 | Lingnau | 228/112.1 |
| 6,648,376 B2 * | 11/2003 | Christianson | 285/146.1 |
| 6,749,160 B1 * | 6/2004 | Richter | 248/206.2 |
| 6,811,146 B1 * | 11/2004 | Giralt | 256/65.01 |
| 2004/0155164 A1 * | 8/2004 | Richter | 248/274.1 |

* cited by examiner

*Primary Examiner*—Amy J. Sterling
(74) *Attorney, Agent, or Firm*—Charles J. Rupnick, Attorney at Law

(57) ABSTRACT

A flexible support apparatus for supporting heavy objects relative to a fixed surface and methods for manufacturing the same are described. The flexible support apparatus is formed of a permanently bendable metal rod that is fused by electrosonic welding to a plastic support base at one end and a plastic mounting bracket at its opposite end with a flexible sheath covering the metal rod. Alternatively, the permanently bendable metal rod is fused by conventional welding or other metal-fusing process to a metal support base at one end and a metal mounting bracket at its opposite end with the flexible sheath covering the metal rod.

12 Claims, 3 Drawing Sheets

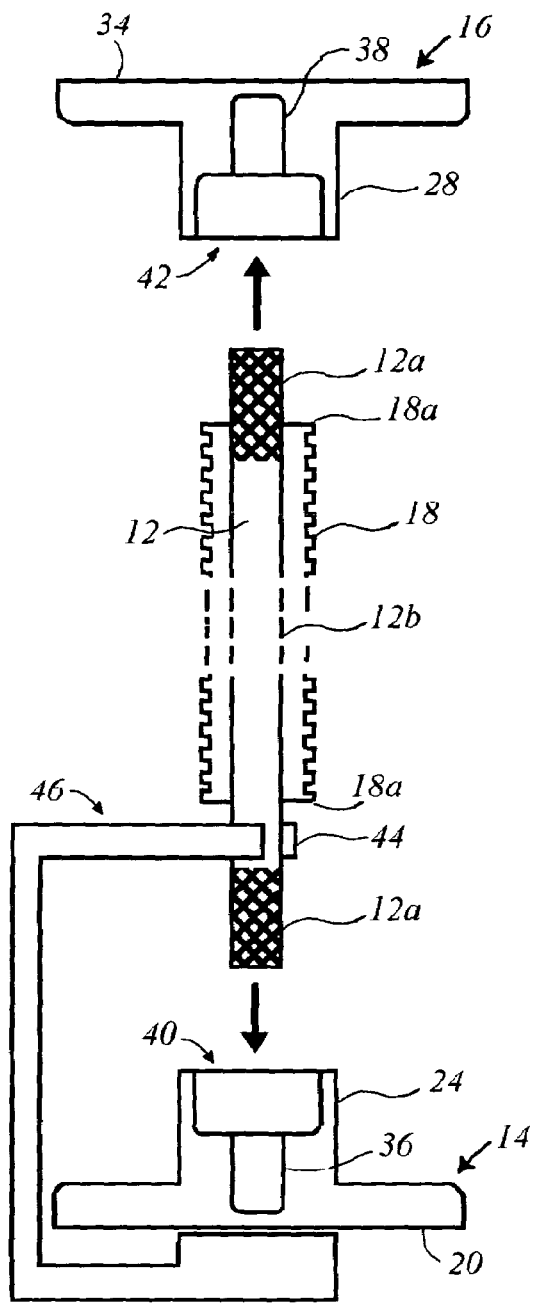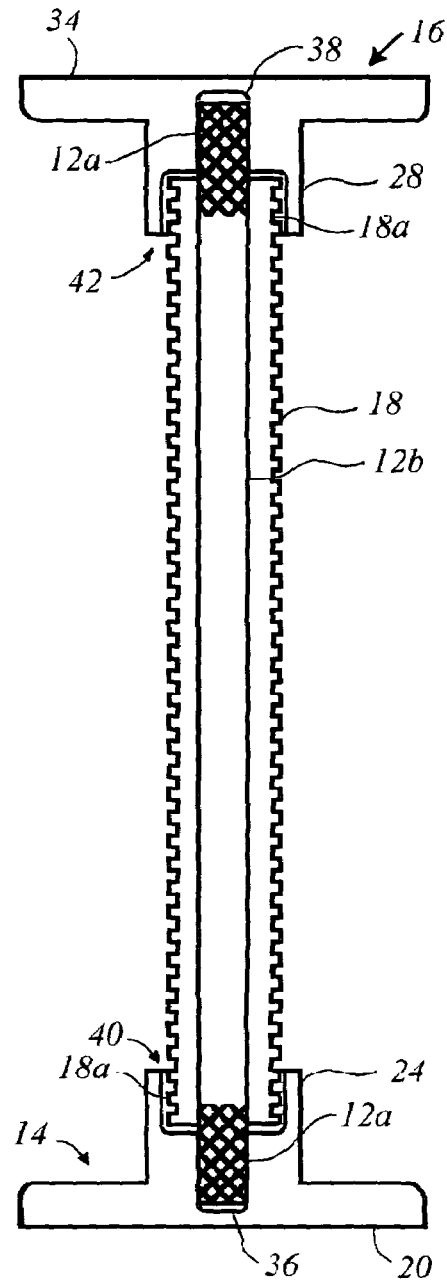
*Fig. 2*  *Fig. 3*

FLEXIBLE SUPPORT ARM

FIELD OF THE INVENTION

The present invention relates to a flexible support apparatus for supporting heavy objects relative to a fixed surface, and in particular to a flexible solid metal support arm having a support base and mounting means at opposite ends.

BACKGROUND OF THE INVENTION

Flexible support arms for heavy objects are generally well-known. Many are adapted with a base for temporarily or permanent mounting to a fixed surface and a mounting platforms for securely supporting different heavy objects such as a lap-top computer. Many known support arms are based upon a readily flexible stalk within a retaining sheath. One example of such a flexible support arm is disclosed by Sheppard, et al. in U.S. Pat. No. 4,842,174, FLEXIBLE MOUNT FOR MOBILE APPARATUS, as a helical coil of heavy gauge spring wire with a filler strip of elastomeric material helically wound about the exterior of the coil spring and in space between turns of the coil, the whole within a retaining sheath formed of a continuous strip of vinyl tape. The degree of flex and the resistance to flex of the stalk is determined by a combination of the gauge of the coil spring wire, the spacing between adjacent turns of the coil, the composition and density of the elastomeric material used for the filler strip and, by the thickness of the strip of vinyl tape and the pressure with which it is wound.

Another version of the readily flexible stalk within a retaining sheath is disclosed by Simons in U.S. Pat. No. 1,786,459, BABY-BOTTLE HOLDER, that is formed from bundle of flexible non-resilient metal wires retained inside a flexible conduit made from a spiral-wound metal strip. The conduit and the wires can be bent and the arm will remain in the position to which it is bent. Ghazizadeh taught the use of this same flexible support arm in U.S. Pat. No. 5,135,189, BABY BOTTLE HOLDER.

While effective for their intended purpose, the type of flexible support arms having a flexible stalk within a retaining sheath are complex and expensive to manufacture while being limited in the weight of the load they can support.

In U.S. Pat. No. 6,032,910, FLEXIBLE SUPPORT ARM FOR SUPPORTING OBJECTS, Richter teaches another type of flexible support arm having a permanently bendable aluminum rod extending between a mounting base and a mounting plate and covered by an elastically flexible plastic tube. As taught by Richter, this type of flexible support arm is overly complex and expensive to manufacture and the weight of the load it can support is limited by the aluminum material used in the permanently bendable support rod.

Other flexible support arms are also currently known. However, current flexible support arms are both overly complex and expensive to manufacture, and are limited in the weight of the load they can support.

SUMMARY OF THE INVENTION

The present invention overcomes the manufacturing and load capacity limitations of the prior art by providing a flexible support apparatus for supporting heavy objects relative to a fixed surface. Accordingly, the flexible support apparatus includes a support base having a first substantially tubular aperture, a mounting bracket having a second substantially tubular aperture, and a permanently bendable metal rod having a first end inserted into the first tubular aperture of the support base and having a first weld joint formed therebetween, and a second end inserted into the second tubular aperture of the mounting bracket and having a second weld joint formed therebetween.

According to another aspect of the invention, the support base and mounting bracket are both formed of an ultrasonically weldable plastic material, and the weld joints formed between the metal rod and each of the support base and the mounting bracket are ultrasonic weld joints. To best accommodate ultrasonic welding, the first and second ends of the metal rod are formed having upset surface material, such as knurled surface material. Furthermore, according to different aspects of the invention, the metal rod is formed of a material selected to be aluminum, copper, or copper coated with another metallic material such as zinc.

According to other aspects of the invention, the metal rod, support base and mounting bracket are formed of aluminum, and the weld joints formed between the metal rod and each of the support base and the mounting bracket are conventional aluminum weld joints.

According to another aspect of the invention, the flexible support apparatus of the invention includes a flexible plastic sheath disposed around the metal rod between the support base and the mounting bracket. Optionally, each of the support base and the mounting bracket include a respective counter-bore substantially concentric with the respective tubular aperture and sized to admit the flexible plastic sheath.

According to another aspect of the invention, a method is provided for forming a flexible support apparatus. Accordingly, the method includes forming a support base having a tubular aperture therein; forming a mounting bracket having a tubular aperture therein; and fusing first and second ends of a permanently bendable metal rod in the respective tubular apertures of the support base and mounting bracket.

According to one aspect of the invention, the method of the invention includes forming the support base of an ultrasonically weldable material; forming the mounting bracket of an ultrasonically weldable material; and ultrasonically welding the first and second ends of the metal rod in the respective tubular apertures of the support base and mounting bracket.

According to another aspect of the invention, the method of the invention includes alternatively forming each of the support base, mounting bracket and metal rod of a weldable aluminum material, and fusing first and second ends of the metal rod in the respective tubular apertures of the support base and mounting bracket by aluminum welding.

According to another aspect of the invention, the method of the invention also includes installing a flexible sheath around the metal rod. Optionally, the method of the invention includes forming in each of the support base and mounting bracket a second tubular aperture therein that is of larger diameter and is substantially concentric with the first tubular aperture having the metal rod fused therein, and inserting the ends of the flexible sheath into the second tubular apertures.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2 and 3 illustrate by example and without limitation one embodiment of the invention for coupling the permanently bendable metal rod to each of the support base and mounting means, wherein FIG. 2 illustrates assembly of the flexible support apparatus of the invention, and FIG. 3 illustrates the embodiment of the flexible support apparatus of FIG. 2 in an assembled state; and FIGS. 4 and 5 illustrate by example and without limitation one alternative embodiment of the invention for coupling the permanently bendable metal rod to each of the support base and mounting means, wherein FIG. 4 illustrates assembly of the flexible support apparatus of the invention, and FIG. 5 illustrates the embodiment of the flexible support apparatus of FIG. 4 in an assembled state.

DETAILED DESCRIPTION OF PREFERRED EMBODIMENT

In the Figures, like numerals indicate like elements.

The present invention is a flexible support apparatus for supporting heavy objects relative to a fixed surface and methods for manufacturing the same. The flexible support apparatus is formed of a permanently bendable metal rod that is fused by electrosonic welding to a plastic support base at one end and a plastic mounting means at its opposite end with an elastically flexible plastic tubular sheath covering the metal rod and optionally secured at opposite ends to the support base and mounting means at the ends of the metal rod.

Alternatively, the flexible support apparatus is formed of a permanently bendable metal rod that is fused by conventional welding or other conventional metal-fusing process to a metal support base at one end and a metal mounting means at its opposite end with the elastically flexible plastic tubular sheath covering the metal rod and optionally secured at opposite ends to the support base and mounting means at the ends of the metal rod.

Figure 1:
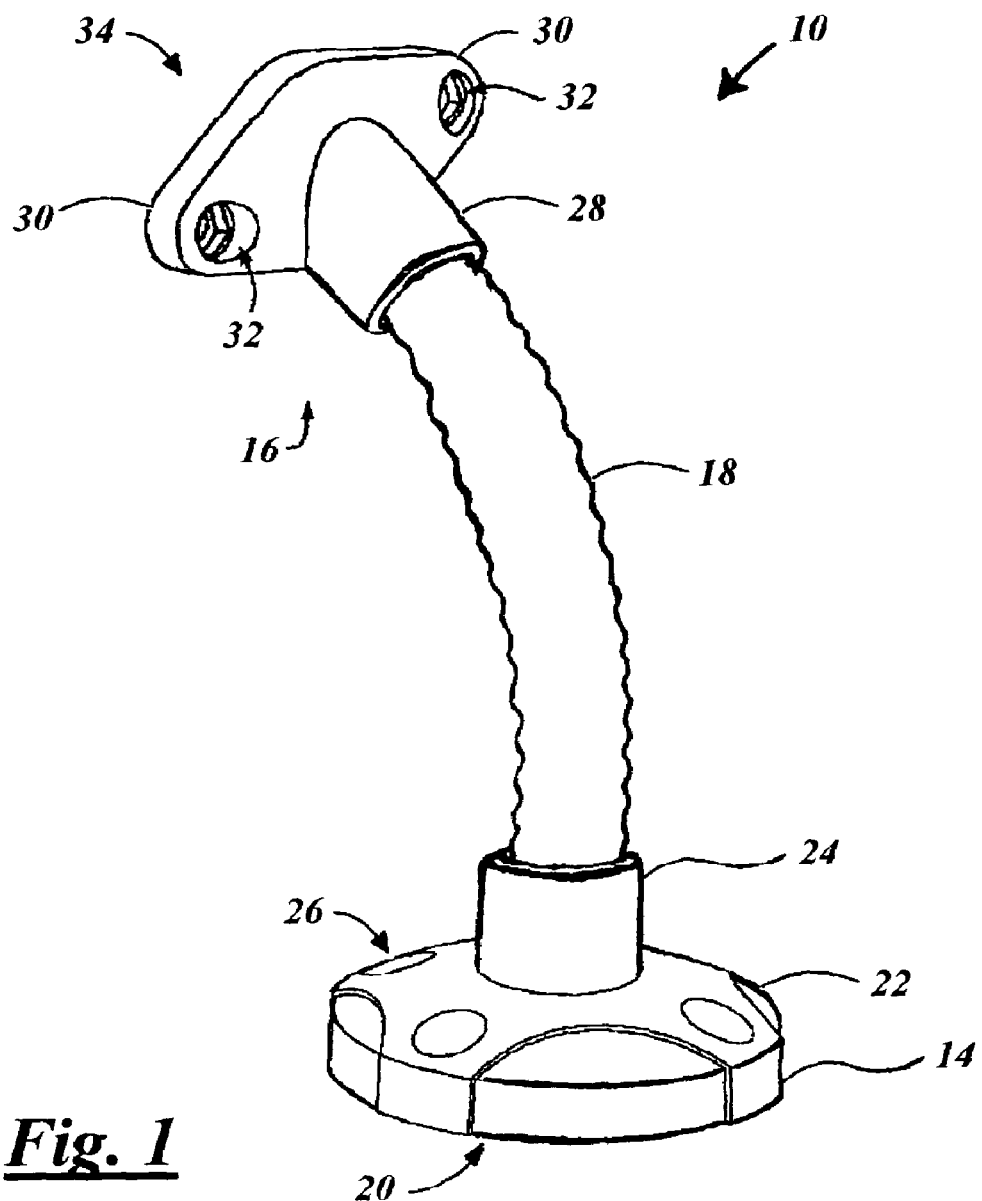
FIG. 1 illustrates the present invention by example and without limitation embodied as a flexible support apparatus formed at its core by a permanently bendable metal rod (shown in subsequent Figures) that is joined at opposite ends to each of a support base and a mounting means wherein the permanently bendable metal rod covered in a flexible sheath.

FIG. 1 illustrates the invention embodied as a flexible support apparatus 10 formed at its core by a permanently bendable metal rod 12 (shown in subsequent Figures and discussed in detail below) that is welded at opposite ends to each of a support base 14 and a mounting means 16 with the metal rod 12 covered in a flexible plastic sheath 18. The support base 14 is formed with a mounting surface 20 on its underside opposite from the main body of the metal rod 12. According to one or more embodiments of the invention, the support base 14 is provided with a peripheral flange 22 having a centrally located tubular boss 24 by which the bendable metal rod 12 is attached, as discussed below. The flange 22 of the support base 14 is optionally structured with multiple apertures 26 that operate as mounting holes by which the base 14 is permanently mounted to a fixed surface, such as a mounting surface in an automobile or other vehicle. The multiple apertures 26 are thus embodied as clearance holes for mounting screws (not shown) used to secure the base 14 to the fixed mounting surface. The apertures 26 are optionally formed with countersinks or counter-bores to accommodate the heads of the mounting screws. According to other embodiments of the invention, the mounting surface 20 of the base 14 is supplied with an adhesively bondable surface, or a resilient adhesive pad, commonly known as a Pressure Sensitive Adhesive or PSA (not shown), applied between the mounting surface 20 of the base 14 and a fixed mounting surface.

According to one or more embodiments of the invention, the mounting means 16 is embodied as a bracket having a tubular boss 28 by which the bendable metal rod 12 is attached, as discussed below. The bracket-type mounting means 16 is optionally structured with a pair of flanges 30 each being optionally structured with one or more apertures 32 that operate as mounting holes by which a device to be supported (not shown) is permanently mounted by means of one or more mounting screws (not shown) to a mounting surface 34 on the top side of the mounting means 16 opposite from the main body of the metal rod 12 and the flexible support apparatus 10. The apertures 32 are optionally formed with countersinks or counter-bores to accommodate the heads of the mounting screws. According to other embodiments of the invention, the mounting surface 34 of the bracket-type mounting means 16 is supplied with an adhesively bondable surface, or a PSA.

According to one or more different embodiments of the invention, the support base 14 is optionally embodied similarly to the bracket-type mounting means 16. According to one or more other different embodiments of the invention, the mounting means 16 is optionally embodied having a peripheral flange similar to the embodiment of the support base 14 illustrated by example and without limitation in FIG. 1.

Other embodiments of the mounting means 16 are also contemplated, including for example a resiliently compressible ball-shaped coupler of the type described by Carnevali in U.S. Pat. No. 5,845,885, UNIVERSALLY POSITIONABLE MOUNTING DEVICE, the complete disclosure of which is incorporated herein by reference.

FIGS. 2 and 3 illustrate by example and without limitation one embodiment of the invention for coupling the permanently bendable metal rod 12 to each of the support base 14 and mounting means 16. According to one embodiment of the invention, the metal rod 12 is formed of solid aluminum. Alternatively, the metal rod 12 is formed of solid copper rod that is optionally coated with zinc. The inventor discovered that use of a solid copper rod 12 provides unexpected substantial structural advantages over the solid aluminum rod of the prior art: the solid copper rod is permanently bendable similarly to the solid aluminum rod, but the copper rod is much stronger for a similar rod diameter so that a relatively slender copper rod can support loads weighing as much as the loads supportable by a larger diameter aluminum rod. Therefore, when embodied as a solid copper rod, the metal rod 12 is formed with a diameter that is much smaller than an aluminum rod for supporting a load of the same weight.

According to the invention as embodied in FIGS. 2, 3 the otherwise smooth metal of rod 12 is knurled or otherwise upset at both ends 12a while remaining substantially unchanged along most of its length 12b between the ends 12a. The base 14 and mounting means 16 are both formed of a plastic material that is suitable for ultrasonic welding. The respective tubular bosses 24, 28 of the base 14 and mounting means 16 are formed with respective substantially tubular apertures 36, 38 that are either blind (shown) or entirely through the body of the respective base 14 and mounting means 16. The apertures 36, 38 are of relatively smaller diameter than the metal rod 12 by an amount determined by the ultrasonic welding process to develop a strong weld joint therebetween.

Optionally, the respective tubular bosses 24, 28 of the base 14 and mounting means 16 are formed with respective counter-bores 40, 42 concentric with the substantially tubular apertures 36, 38 and sized to accept and optionally to securely retain the elastically flexible plastic sheath 18 covering the metal rod 12. According to one embodiment of the invention, the flexible plastic sheath 18 is a corrugated plastic tube, as shown in FIGS. 2, 3. Alternatively, the flexible plastic sheath 18 is one of an accordion configuration, a smooth-finished plastic tube, a thick foam tube, or another flexible plastic sheath that covers the metal rod 12 while permitting it to be bent to desired shapes without interference. Such alternative sheath materials are well-known to those of skill in the art so as not to require detailed descriptions.

FIG. 2 illustrates assembly of the flexible support apparatus 10 of the invention. During assembly, the sheath 18 is fitted over the length of the metal rod 12 and the rod 12 is grasped along its length 12*b* above the upset end portion 12*a* by jaws 44 of a chuck of an ultrasonic welding machine 46, whereafter the upset end portion 12*a* is fused by ultrasonic welding to one of the tubular apertures 36, 38 in the plastic support base 14 or the plastic mounting means 16. Thereafter, the sheath 18 is compressed along the rod length 12*b* which is grasped by the chuck jaws 44 at the second unwelded end above the upset end portion 12*a*, whereafter the upset end portion 12*a* is fused by ultrasonic welding to the tubular aperture 36, 38 in the other one of the plastic support base 14 or the plastic mounting means 16. The sheath 18 is expanded and its open ends 18*a* are grasped, as by hand or machine, and inserted into the respective counter-bores 40, 42 that are concentric with the tubular apertures 36, 38 in the respective base 14 and mounting means 16. The base 14 is thereafter permanently mountable to a fixed surface, a relatively heavy load is permanently mountable to the mounting means 16, and the metal rod 12 is bendable to a desired shape, as illustrated in FIG. 1, to present the supported load according to user's preference.

FIG. 3 illustrates the embodiment of the flexible support apparatus 10 of FIG. 2 in an assembled state wherein a first upset end portion 12*a* of the metal rod 12 is ultrasonically welded into the aperture 36 in the boss 24 of the plastic support base 14, a second upset end portion 12*a* is ultrasonically welded into the aperture 38 in the boss 28 of the plastic mounting means 16, and the flexible plastic sheath 18 is installed over the metal rod 12 with the open ends 18*a* tucked into the counter-bores 40, 42 adjacent to the tubular apertures 36, 38 in the respective support base 14 and mounting means 16.

Figure 4:
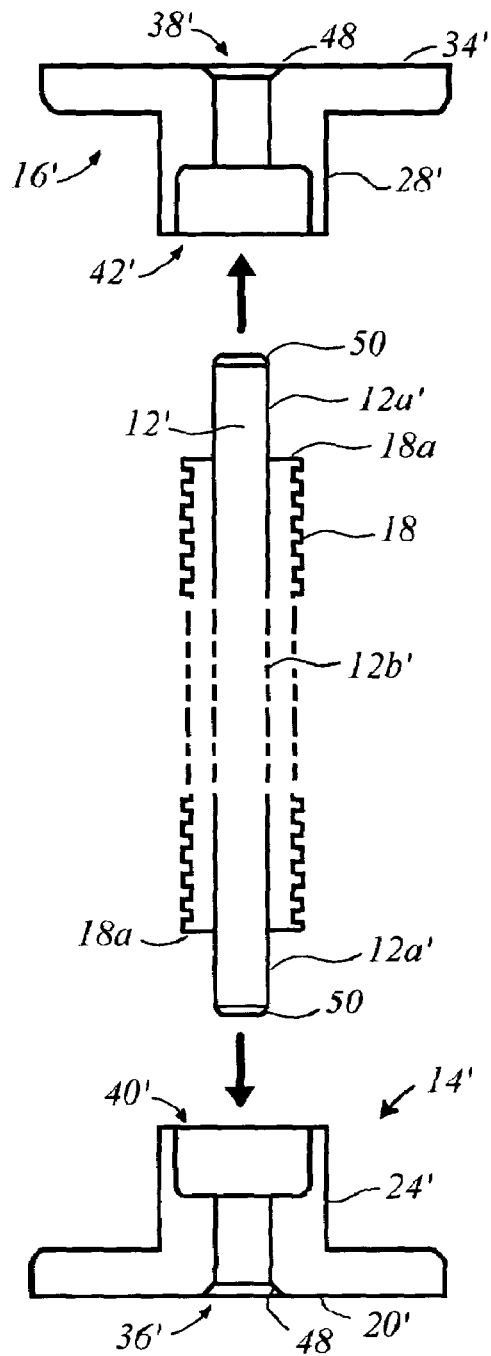
Figure 5:
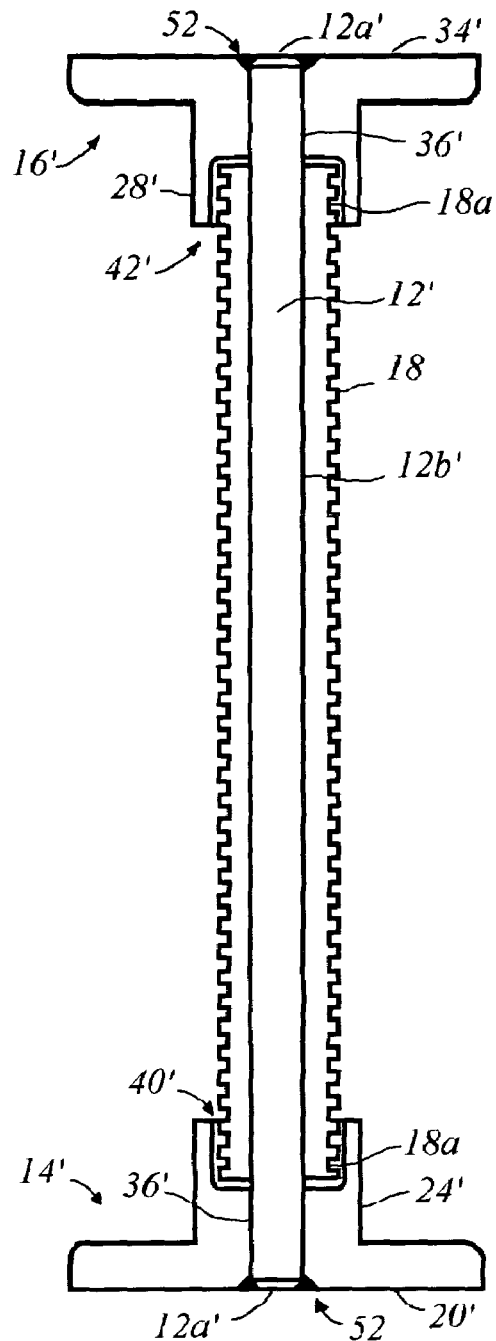

FIGS. 4 and 5 illustrate the invention embodied by example and without limitation as an alternative flexible support apparatus 10' that is formed at its core by a permanently bendable metal rod 12' that is formed of weldable aluminum material and fused by metal-to-metal welding at opposite ends to each of a weldable aluminum support base 14' and a weldable aluminum mounting means 16'. The weldable aluminum rod 12' is covered by the flexible plastic sheath 18 as discussed herein.

The weldable aluminum support base 14' and weldable aluminum mounting means 16' are provided with respective tubular bosses 24', 28' that are formed with respective tubular apertures 36', 38' which are either entirely through the body of the respective base 14' and mounting means 16' (shown) or blind. The apertures 36', 38' are formed having a diameter sized to provide a either a press or a slip fit with the weldable aluminum rod 12'. The apertures 36', 38' are optionally formed having a countersink or other relief 48 at the respective mounting surfaces 20, 34', the countersink or other relief 48 being of relatively larger diameter than the respective apertures 36', 38'.

The solid aluminum rod 12' is formed having a substantially smooth surface that is substantially unchanged along most of its length 12*b*' between its substantially smooth surfaced opposite ends 12*a*'. The ends 12*a*' of the aluminum rod 12' are formed with a chamfer 50 or other edge break to accommodate its insertion into the respective apertures 36', 38'.

Optionally, the respective tubular bosses 24', 28' of the weldable aluminum base 14' and weldable aluminum mounting means 16' are formed with respective counter-bores 40', 42' concentric with the apertures 36', 38' and sized to accept and optionally to securely retain the elastically flexible plastic sheath 18 covering the weldable aluminum rod 12'.

FIG. 4 illustrates assembly of the alternative flexible support apparatus 10' of the invention. During assembly, one of the rod end portions 12*a*' is inserted into one of the tubular aperture 36', 38' in one of the weldable aluminum base 14' and mounting means 16', whereafter the end portion 12*a*' is fused by metal-to-metal welding to one of the weldable aluminum support base 14' or the weldable aluminum mounting means 16'. The welding is performed at the tip of the rod end portion 12*a*' where it meets the mounting surface 20, 34' of the base 14' or mounting means 16' at the juncture of the countersink or other relief 48 and the chamfer 50 or other edge break on the rod end portion 12*a*'. Accordingly, the weld is contained within the space between the relief 48 and the edge break 50 so that a minimum of surface finishing is required to finish the mounting surface 20, 34' for connection to a surface.

Thereafter, the sheath 18 is compressed along the rod length 12*b*' and the second unwelded rod end portion 12*a*' is inserted into the other one of the tubular aperture 36', 38' in the other one of the weldable aluminum support base 14' or the weldable aluminum mounting means 16', whereafter welding is performed at the tip of the second heretofore unwelded rod end portion 12*a*' where it meets the mounting surface 20, 34' of the heretofore unwelded base 14' or mounting means 16' at the juncture of the relief 48 and the other edge break 50 on the second rod end portion 12*a*'.

Alternatively, the welding is performed between the weldable aluminum rod 12' and each of the weldable aluminum support base 14' and the weldable aluminum mounting means 16' at respective point set back from the tip of the rod end portions 12*a*' where the rod 12' meets the bases of the respective counter-bores 40', 42' in the base 14' and mounting means 16'. Accordingly, the welds are contained within the counter-bores 40', 42' so that no surface finishing is required to finish the mounting surfaces 20, 34' for installation.

The sheath 18 is expanded and its open ends 18*a* are grasped, as by hand or machine, and inserted into the respective counter-bores 40', 42' in the base 14' and mounting means 16'. The base 14' is thereafter permanently mountable to a fixed surface, a relatively heavy load is permanently mountable to the mounting means 16', and the weldable aluminum rod 12' is bendable to a desired shape, as illustrated in FIG. 1, to present the supported load according to user's preference.

FIG. 5 illustrates the embodiment of the flexible support apparatus 10' of FIG. 4 in an assembled state wherein a first end 12*a*' of the weldable aluminum rod 12' is metal welded into the aperture 36' in the boss 24' of the weldable aluminum support base 14', a second end 12*a* of the weldable aluminum rod 12' is metal welded into the aperture 38' in the boss 28' of the weldable aluminum mounting means 16, and the flexible plastic sheath 18 is installed over the weldable aluminum rod 12' with the open ends 18*a* tucked into the counter-base 40', 42' in the respective weldable aluminum support base 14' and mounting means 16'.

According to another alternative embodiment, a solderable copper rod is substituted for the weldable aluminum rod 12' of FIGS. 4, 5, and copper of another suitable material is substituted for the weldable aluminum of the support base 14' and mounting means 16' wherein the substitute material of the support base 14' and mounting means 16' is fusible by conventional soldering techniques. Accordingly, the method of fusing by welding described in FIGS. 4, 5 is replaced by soldering for fusing the substitute solderable copper rod 12' to each of the substitute solderable support base 14' and mounting means 16' in similar manner to the described welding, except that solder is used between the substitute solderable copper rod 12' and each of the substitute solderable support base 14' and mounting means 16' to form the joints therebetween. By example and without limitation the substitute solderable support base 14' and mounting means 16' are formed of brass, bronze, or copper and optionally include a suitable coating of a type known in the art to improve solderability.

According to yet another alternative embodiment, the flexible support apparatus is formed of a permanently bendable metal rod that is fused by adhesive bonding to a metal or plastic support base at one end and a metal or plastic mounting means at its opposite end with the elastically flexible plastic tubular sheath covering the metal rod and optionally secured at opposite ends to the support base and mounting means at the ends of the metal rod.

While the preferred embodiment of the invention has been illustrated and described, it will be appreciated that various changes can be made therein without departing from the spirit and scope of the invention. For example, materials may be substituted for the different components of the flexible support apparatus of the invention without departing from the spirit and scope of the invention. Therefore, the inventor makes the following claims.

What is claimed is:

1. A flexible support apparatus comprising:
   a support base having an opening in one surface;
   a mounting bracket having an opening in one surface; and
   a permanently bendable continuously solid metal rod having a first end installed in the opening of the support base and fused directly thereto with a weld joint formed directly between the first end of the metal rod and the support base, and having a second end installed in the opening of the mounting bracket and fused directly thereto with a weld joint formed directly between the second end of the metal rod and the mounting bracket.

2. The apparatus of claim 1 wherein the metal rod is of substantially constant diameter between the first and second ends thereof.

3. The apparatus of claim 2 wherein each of the opening in the support base and the opening in the mounting bracket further comprises a second larger opening into which opposite ends of the flexible sheath are inserted.

4. The apparatus of claim 3 wherein each of the support base and the mounting bracket are formed of an ultrasonically weldable plastic material.

5. The apparatus of claim 4 wherein the metal rod further comprises a solid metal rod formed of a material selected from the group of materials comprising: aluminum, copper, and copper coated with another metal material.

6. The apparatus of claim 5 wherein the first and second ends of the metal rod further comprise an upset metal finish.

7. The apparatus of claim 3 wherein each of the metal rod, the support base and the mounting bracket are formed of a material that is metal-to-metal weldable by conventional means.

8. A flexible support apparatus for supporting heavy objects relative to a fixed surface, the flexible support apparatus comprising:
   a support base formed of an ultrasonically weldable plastic material and having a substantially tubular aperture;
   a mounting bracket formed of an ultrasonically weldable plastic material and having a substantially tubular aperture; and
   a permanently bendable continuously solid metal rod having first and second ends each further comprising upset surface material, the first end being inserted into the tubular aperture of the support base and having an ultrasonic weld joint formed therebetween, and the second end being inserted into the tubular aperture of the mounting bracket and having an ultrasonic weld joint formed therebetween.

9. The apparatus of claim 8 wherein the metal rod further comprise a metal rod formed of a material selected from the group of materials comprising: aluminum, copper, and copper coated with zinc.

10. A flexible support apparatus for supporting heavy objects relative to a fixed surface, the flexible support apparatus comprising:
    support base having a substantially tubular aperture;
    a mounting bracket having a substantially tubular aperture;
    a permanently bendable continuously solid metal rod having a first end inserted into the tubular aperture of the support base and having a weld joint formed therebetween, and a second end inserted into the tubular aperture of the mounting bracket and having a weld joint formed therebetween;
    a flexible plastic sheath disposed around the metal rod between the support base and the mounting bracket; and
    wherein each of the support base and the mounting bracket further comprises a respective counter-bore substantially concentric with the respective tubular aperture and sized to admit the flexible plastic sheath.

11. A method for forming a flexible support apparatus, the method comprising:
    molding a support base of an ultrasonically weldable plastic material and having a tubular aperture therein;
    molding a mounting bracket of an ultrasonically weldable plastic material and having a tubular aperture therein;
    upsetting metal around first and second ends of a length of permanently bendable continuously solid metal rod prior to welding;
    ultrasonically welding the first end of the metal rod in the tubular aperture of the support ultrasonically welding the second end of the metal rod in the tubular aperture of the mounting bracket.

12. The method of claim 11 wherein:
    forming a support base having a tubular aperture therein further comprises forming a second tubular aperture therein that is of larger diameter and is substantially concentric with a first tubular aperture having the metal rod welded therein;
    forming a mounting bracket having a tubular aperture therein further comprises forming a second tubular aperture therein that is of larger diameter and is substantially concentric with a first tubular aperture having the metal rod fused therein; and
    installing a flexible sheath around the metal rod by inserting opposite ends of the flexible sheath into the respective second tubular apertures.

* * * * *